UNITED STATES PATENT OFFICE.

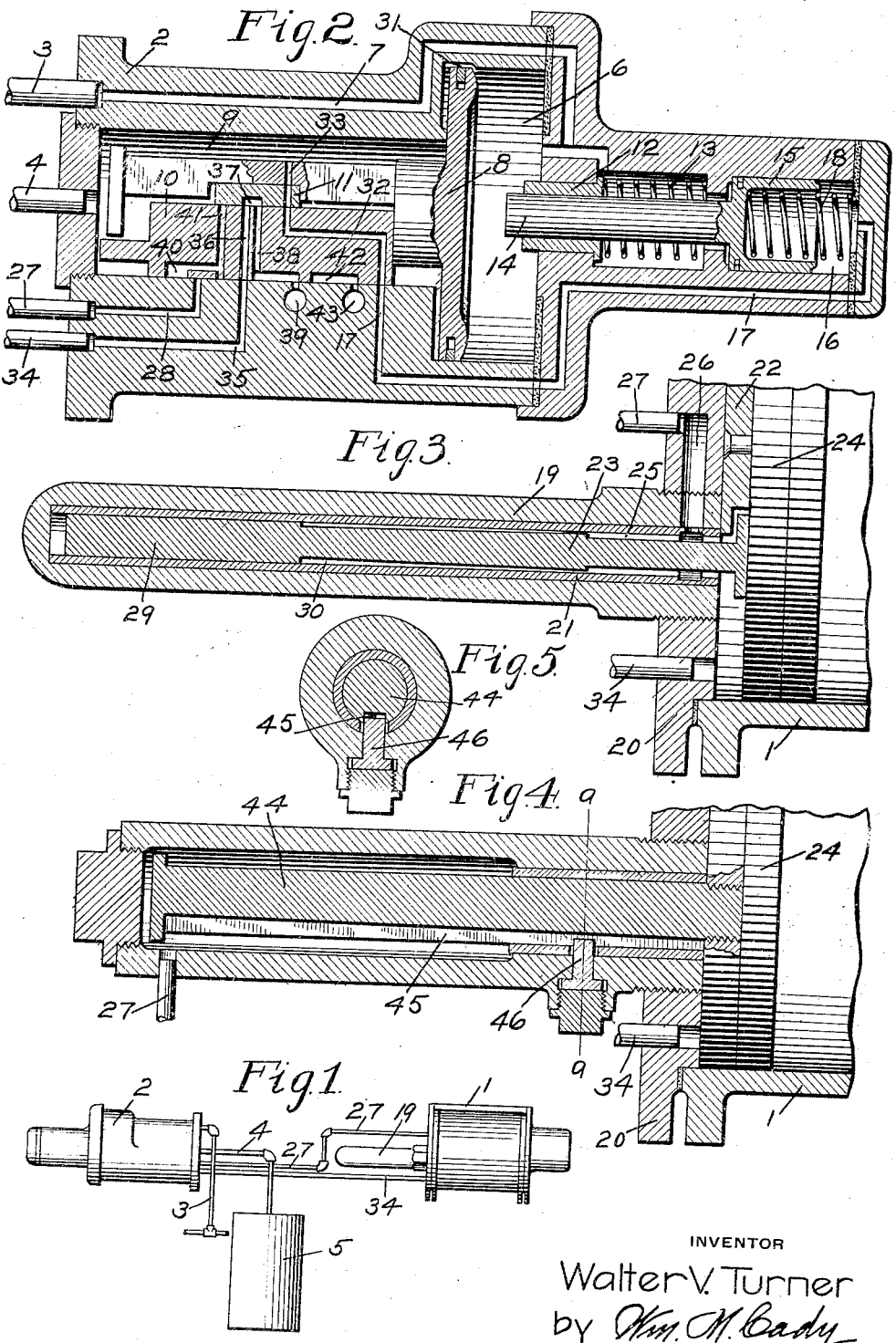

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,343,694.     Specification of Letters Patent.     Patented June 15, 1920.

Application filed January 16, 1917. Serial No. 142,624.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a brake controlling valve device.

In some instances, excessive spring in the brake rigging, and creeping of the brake shoes around the car wheels causes an undue amount of brake cylinder piston travel beyond the normal, where heavy applications of the brakes are made, and this so-called false piston travel operates the slack adjuster to take up slack, so that while the brake cylinder piston travel might correspond with the normal standard travel so long as heavy applications of the brakes are made, if a light application of the brakes is effected, then the brake cylinder piston travel will fall short of the standard, since the spring of the brake rigging and the drag of the brake shoes will be slight. As a consequence, the brake cylinder pressure obtained for a given reduction in brake pipe pressure will be greater than intended and will result in an initial braking force at the head end of the train sufficient to cause the rear cars to run into the head cars and cause shocks before the brakes can be applied at the rear end of the train.

The principal object of my invention is to provide means for initially limiting or retarding the development of brake cylinder pressure under the above circumstances so as to permit of a more gradual bunching of the slack and the consequent avoidance of damaging shocks.

In the accompanying drawing; Figure 1 is a diagrammatic view of a car fluid pressure brake equipment embodying one form of my invention; Fig. 2 a central sectional view of the triple valve device employed in the equipment shown in Fig. 1; Fig. 3 a central sectional view of the member attached to the brake cylinder for regulating the flow of fluid thereto; Fig. 4 a central sectional view of a modified construction for regulating the flow of fluid to the brake cylinder; and Fig. 5 a transverse section on the line *a—a* of Fig. 4.

As shown in Fig. 1 of the drawing, the car brake equipment may comprise a brake cylinder 1 and a triple valve device 2 connected to brake pipe 3 and by a pipe 4 to auxiliary reservoir 5.

The triple valve device 2 comprises a casing having a piston chamber 6 connected by passage 7 to brake pipe 3 and containing piston 8, and a valve chamber 9 open to the auxiliary reservoir 5 and containing a main slide valve 10 and an auxiliary slide valve 11 adapted to be operated by piston 8.

According to my invention, a two position piston stop device is provided comprising a sleeve stop member 12 subject to the pressure of a spring 13 and corresponding substantially with the usual piston stop and an additional stop member having a stem 14 extending through the sleeve member 12 and adapted to be engaged by piston 8 and having a piston 15 contained in piston chamber 16 which is connected to a passage 17 leading to the seat of slide valve, the piston being subject to the pressure of a spring 18.

The means for restricting the flow of fluid to the brake cylinder may comprise, according to the construction shown in Fig. 3 of the drawing, a casing 19 adapted to be secured to the pressure head 20 of brake cylinder 1 and containing a bushing 21 within which is mounted a stem 23, secured to brake cylinder piston 24 by means of a notched plate 22.

A portion of stem 23 adjacent to the brake cylinder piston 24 is of reduced cross section to provide an annular passage 25 and a passage 26 opens to the passage 25. A pipe 27, connected to passage 28 leading to the seat of slide valve 10, is connected to passage 26 and said pipe also connects with the outer end of casing 19. An annular tapering passage 30 extends rearwardly from passage 25.

In the operation of the above described form of my invention, when fluid is supplied to brake pipe 3, fluid flows to piston chamber 6 and thence through the usual feed groove 31 around the triple valve piston 8, charging the valve chamber 9 and auxiliary reservoir 5. With the triple valve parts in release position, as shown in the drawing, passage 17 is connected to valve chamber 9 through port 32 in slide valve 10 and port 33 in auxiliary valve 11, so that piston chamber 16 is charged with fluid under pressure. The brake cylinder 1 is connected to the exhaust through a direct pipe 34, passage 35, port 36, cavity 37 in auxiliary valve 11, port 38, and exhaust port 39.

When the brake pipe pressure is reduced to effect a service application of the brakes, the triple valve piston moves out to engage the end of stem 14 and slide valve 10 assumes a position in which cavity 40 registers with passage 28. Fluid is thereupon supplied from the auxiliary reservoir 5 through service port 41 to pipe 27 and thence through passage 26 and annular passage 25 to the brake cylinder.

This annular passage permits full flow to the brake cylinder, so that initially, ample flow is provided to insure movement of the brake cylinder piston beyond the usual leakage grooves. When the brake cylinder piston has moved out a predetermined distance, say three or four inches, passage 25 is cut off and fluid can only flow to the brake cylinder by way of the restricted annular passage 30.

As the brake cylinder piston moves out farther, the area of annular passage 30 increases, so that the flow to the brake cylinder is gradually increased. The initial restriction of the rate of flow to the brake cylinder prevents the building up of a relatively high brake cylinder pressure, so that the rate of retardation of the head cars is reduced and this permits the slack to be bunched without damaging shocks.

After the brake pipe pressure has been reduced, so that a sufficient differential pressure is developed on the triple valve piston 8 by the higher auxiliary reservoir pressure, the piston stop 14 is forced outwardly against the resistance of spring 18 until the piston engages the stop 12. In this position of the piston, the slide valve 10 is adapted to connect port 41 with passage 35, so that fluid is supplied from the auxiliary reservoir to the brake cylinder through the direct pipe 34. In this position, passage 17 is connected by cavity 42 with exhaust port 43, so that fluid is vented from piston chamber 16 and the brake pipe pressure acting on the opposite side of piston 15 will then shift same outwardly.

The piston stop 12 now acts alone and corresponds substantially with the usual triple valve piston stop in operation, the rate of flow to the brake cylinder being thereafter at normal full service rate, according to the rate at which the brake pipe pressure is reduced.

According to the modified construction shown in Figs. 4 and 5 of the drawing, a stem 44 is secured to the brake cylinder piston, having a tapered groove 45 into which a plug 46 projects.

The rate of flow from pipe 27 to the brake cylinder is determined by the free area of the groove 45 with respect to the plug 46 and as the brake cylinder piston moves outwardly, this area is gradually increased, until the area is such as to give the full service rate of flow.

Having now described my invention, what I claim as new and desire to secure by Letters Patent is:

1. In a fluid pressure brake, the combination with a brake cylinder, of means for continually changing the rate of flow of fluid to the brake cylinder as the brake cylinder piston moves out.

2. In a fluid pressure brake, the combination with a brake cylinder containing a brake cylinder piston, of means for continually varying the rate of flow of fluid to the brake cylinder in a service application of the brakes in accordance with the position of the brake cylinder piston.

3. In a fluid pressure brake, the combination with a brake cylinder, of means operated by the brake cylinder piston for partially restricting communication through which fluid is supplied to the brake cylinder.

4. In a fluid pressure brake, the combination with a brake cylinder containing a brake cylinder piston, of means operated by the brake cylinder piston for partially restricting communication through which fluid is supplied to the brake cylinder upon a predetermined movement of the piston.

5. In a fluid pressure brake, the combination with a brake cylinder containing a brake cylinder piston, of means operated by the brake cylinder piston and adapted at a predetermined brake cylinder piston travel to restrict communication through which fluid is supplied to the brake cylinder and to gradually enlarge said communication upon a further movement of the brake cylinder piston.

6. In a fluid pressure brake, the combination with a brake cylinder containing a brake cylinder piston, of a stem movable with the brake cylinder piston and adapted upon a predetermined initial movement of the brake cylinder piston to restrict communication through which fluid is supplied to the brake cylinder and to gradually enlarge said communication upon a further movement of the brake cylinder piston.

7. In a fluid pressure brake, the combination with a brake cylinder, of a triple valve device adapted in a service application of the brakes to first supply fluid through a restricted communication to the brake cylinder and then through an unrestricted communication to the brake cylinder.

8. In a fluid pressure brake, the combination with a brake cylinder, of a triple valve device having an initial and a final service position, a stop device for defining the initial service position, and a second stop device for defining the final service position.

9. In a fluid pressure brake, the combination with a brake cylinder, of a triple valve device for controlling the admission of fluid to the brake cylinder and having an initial and a final service application position, a stop device subject to opposing fluid pressures for defining the initial service position, a second stop device for defining the final service position, and means controlled by the triple valve device for venting fluid from one side of the first stop device.

10. In a fluid pressure brake, the combination with a brake cylinder, of a triple valve device for controlling the admission of fluid to the brake cylinder and having an initial and a final service application position, a stop device subject on one side to the pressure of a spring and on opposite sides to fluid pressure for defining the initial service position, a second stop device subject on one side to the pressure of a spring for defining the final service position, and means controlled by the triple valve device for venting fluid from one side of the first stop device, to effect the withdrawal of said stop device from engagement with the triple valve device.

In testimony whereof I hereunto set my hand.

WALTER V. TURNER.